United States Patent [19]

Sittler

[11] 4,326,864
[45] Apr. 27, 1982

[54] APPARATUS FOR AND METHOD OF COLLECTING SAWDUST PARTICLES

[76] Inventor: Werner G. Sittler, 4051 E. Calypso, Mesa, Ariz. 85206

[21] Appl. No.: 176,506

[22] Filed: Aug. 8, 1980

[51] Int. Cl.³ ............................................ B01D 46/02
[52] U.S. Cl. ........................................ 55/364; 55/378; 55/385 R; 55/429; 83/98; 83/167; 248/100
[58] Field of Search ................ 55/428, 429, 361, 364, 55/378, 385 R; 248/98–100; 83/167

[56] References Cited

U.S. PATENT DOCUMENTS

| | | | |
|---|---|---|---|
| 296,135 | 4/1884 | Cole | 248/100 |
| 1,267,171 | 5/1918 | Bee . | |
| 1,403,112 | 1/1922 | Ford | 55/364 |
| 2,639,110 | 5/1953 | Nicolas | 248/99 |
| 2,839,102 | 6/1958 | Kido . | |
| 3,274,892 | 9/1966 | Carsey . | |
| 3,322,169 | 5/1967 | Hilliard . | |
| 3,945,281 | 3/1976 | Kreitz . | |
| 4,063,478 | 12/1977 | Stuy . | |

FOREIGN PATENT DOCUMENTS

| | | | |
|---|---|---|---|
| 895012 | 4/1962 | United Kingdom | 83/167 |
| 1545086 | 5/1979 | United Kingdom | 248/99 |

Primary Examiner—Bernard Nozick
Attorney, Agent, or Firm—Harry M. Weiss

[57] ABSTRACT

This disclosure relates to sawdust collecting apparatus which incorporates a bag having a screened aperture at a medial portion thereof, which bag is disposed to receive sawdust generated by a saw, to serve as a device to collect the sawdust particles while permitting moving air to escape through the screened aperture.

2 Claims, 7 Drawing Figures

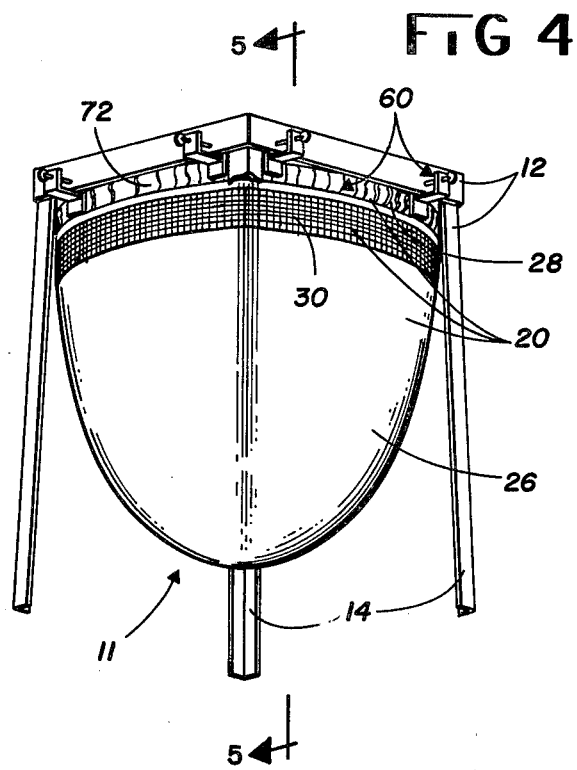
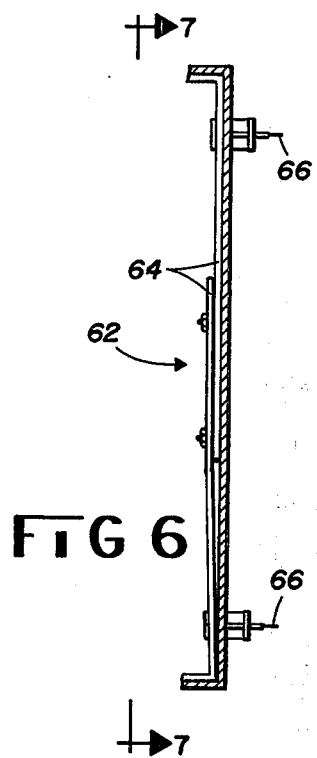
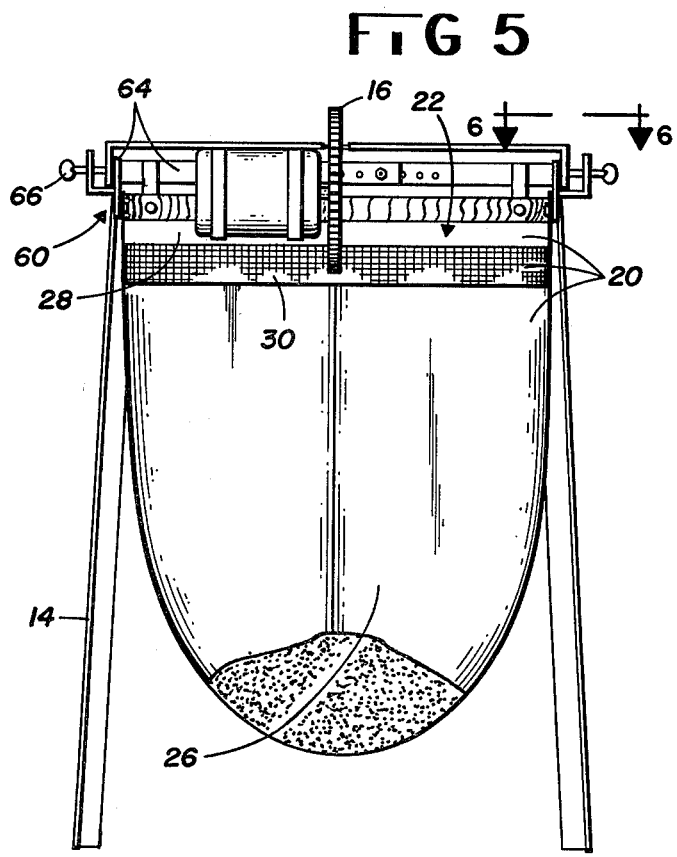
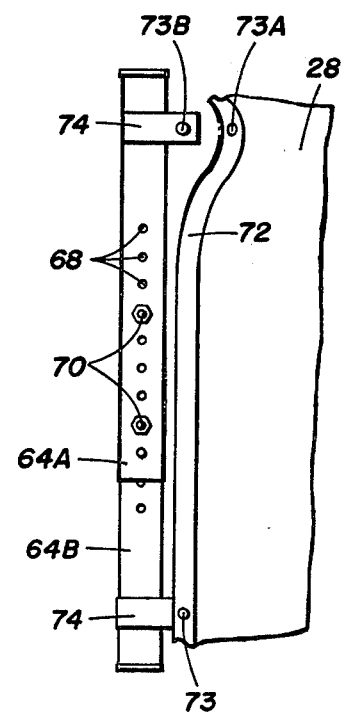

APPARATUS FOR AND METHOD OF COLLECTING SAWDUST PARTICLES

BACKGROUND OF THE INVENTION

1. Field of the Invention

This invention relates generally to sawdust collecting apparatus and, more specifically, to a sawdust collecting bag having a screened vent portion between the inlet to the bag and the bottom of the bag. The herein disclosed bag can be used as a receptacle for the flow from a vacuum-collecting system, or may be advantageously used alone to collect sawdust transported by a combination of gravity and the air currents generated by the rotation of the saw blade.

2. Description of the Prior Art

In the past, saws have been extensively utilized for altering the dimensions of objects by cutting away portions of the object. That cutting operation is accomplished by cutting individual chips from the object with the sequential moving teeth of a saw to form a kerf, or saw cut. Once cut from the object, the chips are removed from the cutting situs by the continued movement of the sawblade. The rotation of the saw blade generates air currents which, in combination with gravity, and in the case of a rotary saw the centrifugal force generated by the rotary motion of the blade, tend to distribute the accumulation of chips, or sawdust, generally about in a manner necessitating a clean-up after the use of the saw, at least where the use of the saw is in an area which is preferably maintained in a clean condition.

Various devices have been developed to collect dust and chips generated by a cutting or grinding operation. A typical approach is shown by U.S. Pat. No. 1,267,171, issued to H. L. Bee for a dust collector on May 21, 1918. The Bee patent features the use of the dust collecting apparatus for a grinding or buffing device, which incorporates a vacuum generator whose inlet is coupled to a hood generally surrounding the dust generating portion of the device, and whose outlet is provided with a bag so that the flow generated by the rotary vacuum pump will be filtered through the bag.

Another typical device of the prior art is shown by U.S. Pat. No. 2,839,102, issued to G. S. Kido on June 17, 1958. The Kido patent teaches the use of a table level hood to permit a vacuum source to collect sawdust generated by a radial arm saw. Similarly U.S. Pat. No. 3,274,892, issued to E. A. Carsey on Sept. 27, 1966, teaches the use of a hood assembly mounted above the table of a metal working machine to permit dust and metal chips to be collected by a vacuum source without interfering with the operation of the metal working machine. Other suction operated dust collecting devices designed to be operated above the working surface of a saw are shown respectively by U.S. Pat. No. 3,322,169, issued May 30, 1967 to L. E. Hillard, and by U.S. Pat. No. 3,945,281, issued Mar. 23, 1976 to L. D. Kreitz. A particular type of below-the-table mounted sawdust collecting hood, for use in conjunction with a vacuum source, is shown by U.S. Pat. No. 4,063,478, issued on Dec. 20, 1977 to H. Stuy. Each of the devices of the prior art required a powered vacuum source to effectively function as a sawdust collector. A need existed for a device to permit a collection of a substantial portion of the dust and chips generated by a saw, grinder or other similar unit, which device did not require an expensive vacuum system.

BRIEF DESCRIPTION OF THE DRAWING

FIG. 4 is an elevational perspective view of a second embodiment of a sawdust catcher apparatus coupled to a table saw.

FIG. 5 is an enlarged sectional elevational view taken along line 5—5 of FIG. 4.

FIG. 6 is a view taken along line 6—6 of FIG. 5 with portions of the saw removed to reveal a section.

FIG. 7 is an elevational view taken along line 7—7 of FIG. 6.

SUMMARY OF THE INVENTION

In accordance with one embodiment of this invention, it is an object to provide a sawdust catcher apparatus.

It is another object to provide a simple, low-cost sawdust catcher.

It is a further object to provide a sawdust catcher apparatus having a bag provided with a screened outlet at a medial portion to permit air currents to escape while retaining sawdust within the bag.

It is still a further object to provide a sawdust catcher apparatus having a bag provided with an inlet at an uppermost portion, a screened outlet aperture at a medial portion and a sawdust collecting bag at a lower portion.

It is a further object to provide a sawdust catcher apparatus having an adjustable frame and further having a sawdust collector bag having an adjustable upper portion to permit the catcher apparatus to be coupled to various models of existing table saws.

DESCRIPTION OF THE PREFERRED EMBODIMENTS

In accordance with one embodiment of this invention, a sawdust catcher is disclosed which comprises: collecting means having a bag provided with an inlet port and outlet port for collecting the sawdust from a saw; and coupling means for attaching the bag to the saw.

In accordance with another embodiment of this invention, a method for collecting sawdust from a tablesaw is disclosed comprising the steps of: coupling a bag member to the saw below the saw; and venting the volume of the bag with at least an aperture defined by a medial lateral portion of the bag.

The foregoing and other objects, features and advantages will be apparent from the following, more particular, description of the preferred embodiments of the invention, as illustrated in the accompanying drawings.

THE SPECIFICATION

Figure 1:
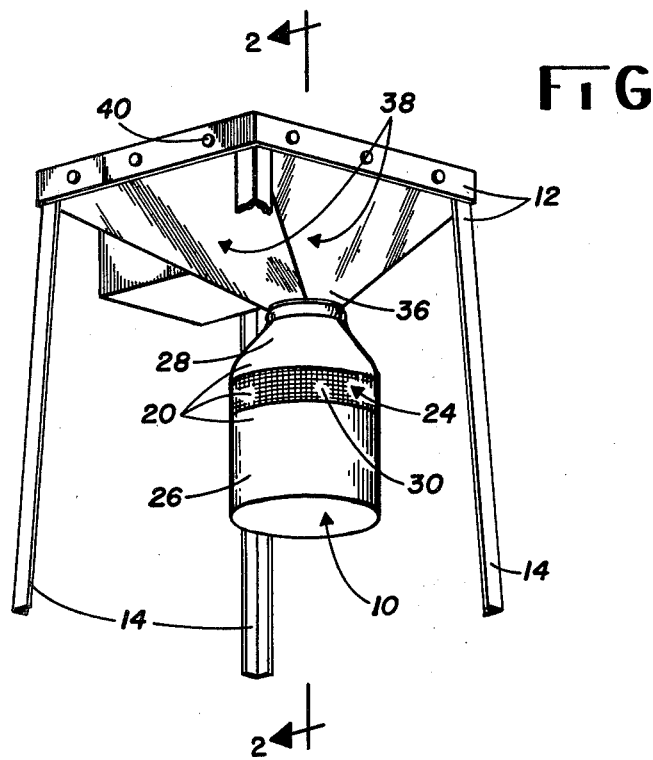
FIG. 1 is an elevational perpsective view of a sawdust catcher coupled to a table saw.

Referring to FIG. 1, a perspective elevational view of a first embodiment of a sawdust catcher is shown generally by reference number 10, coupled to a table saw 12. The saw 12 is provided with legs 14, of which portions are removed to more clearly illustrate the sawdust catcher 10. The saw 12 is provided with blade 16 (Refer also to FIG. 2) which is useful for sawing materials, by cutting therefrom small particles commonly referred to as chips or sawdust. While the saw 12 shown is of a table-type as commonly utilized by, for example, carpenters and homeowners, it will be apparent to one skilled in the art that the sawdust catcher 10 could be advantageously utilized with other types of dust and chip generating equipment, as for example, a radial arm saw or a grinder.

Figure 2:
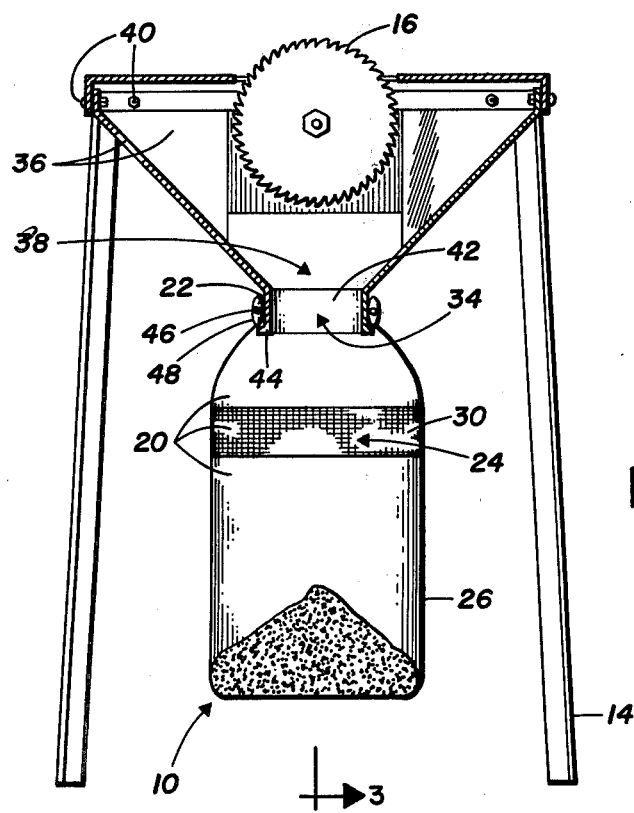
FIG. 2 is an enlarged sectional elevational view taken along line 2—2 of FIG. 1.

Referring also to FIG. 2, a sectional elevational view taken along line 2—2 of FIG. 1, the catcher 10 is shown comprised of collecting means, having a bag shown generally by reference number 20, for collecting sawdust from the saw 12 and coupling means for attaching the bag 20 to the saw 12. The bag 20 is provided with an inlet port, shown generally by reference number 22, and an outlet port, shown generally by reference number 24.

As shown in the embodiment 10, the bag 20 is provided with a bottom portion 26, and an upper portion 28 superior to the bottom portion 26. The uppermost region of the upper portion 28 defines the inlet port 22. As shown, the outlet port 24 comprises a region lying between the bottom and upper portions 26, 28. The outlet port 24 could be a series of openings, or even a single opening, defined by an embodiment of the bag 20 having continuous bottom and upper portions 26, 28. The preferred embodiment 10, however, incorporates a single continuous outlet port 24, which spaces the bottom and upper portions 26, 28 apart. The collecting means are also provided with mesh means for exhausting or venting air from, and for trapping or screening sawdust particles within, the volume of the bag 20. The mesh means are shown as a foraminate screen 30 which is at least coextensive with the outlet port 24. In the embodiment 10, the screen 30 is peripherally sealed on one edge to the bottom portion 26 of the bag 20, and is peripherally sealed on an opposite edge to the upper portion 28 of the bag 20. The screen 30 thereby also comprises the structural connection between the bottom and upper portions 26, 28.

The collecting means of the embodiment 10 further preferably incorporate funnel means, having an outlet aperture 34, for funnelling sawdust generated by the saw through the outlet aperture 34. The funnel means are provided with one or more plates 36 which are shown meeting in pairs to define a funnel 38 to collect the sawdust toward the outlet aperture 34. The interior surfaces of plates 36 are inclined downward toward an edge at a lower end, which edge defines the outlet aperture 34. The funnel 38 can be integrally formed with the saw 12, or can be fabricated as a separate member and coupled to the saw 12, for example, by bolts 40. An outlet conduit 42 is coupled to the funnel 38 about the outlet aperture 34, and further defines the outlet aperture 34.

The coupling means of the embodiment 10 are comprised of funnel means, including the outlet conduit 42, and linking means for permitting the bag 20 to be linked to the outlet conduit 42. The linking means are comprised of a the outlet conduit 42 having a first particular external circumference, the inlet port 22 portion of the bag 20 having a particular internal circumference greater than the first particular external circumference; and string means for tying the inlet port 22 portion of the bag 20 to the outlet conduit 42. The linking means are further advantageously comprised of the outlet conduit 42 having a lip 44. The lip 44 is provided with a second particular external circumference which is greater than the first particular external circumference, so that when the inlet port portion 22 is tied to the first particular circumference region of the outlet conduit 42, the inlet port portion 22 of the bag 20 cannot slip past the lip 44. The string means are shown as a cord 46 which girdles the external circumference of the inlet port portion 22 of the bag 20, and has the ends secured together. The ends of the cord 46 can be secured together, for example, with any of a plurality of well known knots. The cord 46 is preferably retained in contact with the bag 20 by a flap 48 which is coupled to the bag 20 to form a pocket. The cord 46 can be advantageously fabricated from a resilient elastomeric material so that when installed, the cord 46 biases the inlet port portion 22 against the outlet conduit 42 and further so that the bag 20 can be installed or removed by simply stretching the cord 46 and the inlet port portion 22 sufficiently to clear the lip 44 of the outlet conduit 42.

Figure 3:
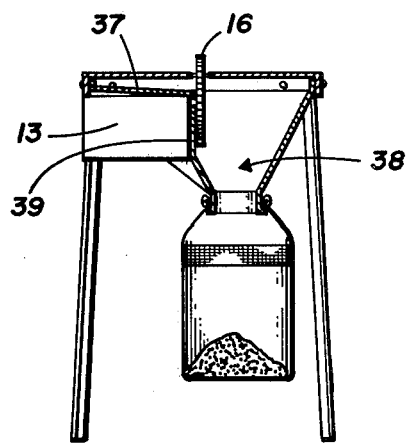
FIG. 3 is a sectional elevational view taken along line 3—3 of FIG. 2.

Referring also to FIG. 3, a sectional elevational view taken along line 3—3 of FIG. 2 is shown. The saw 12 is furnished with drive and control hardware, of a well known type, shown generally by reference number 13. The funnel 38 is provided with first and second shield plates 37, 39 which form additional portions of the funnel 38, and which are each peripherally sealed to particular ones of the plates 36.

Referring then to FIG. 4, a perspective elevational view of a second embodiment of a sawdust catcher, shown generally by reference number 11, is illustrated coupled to the table saw 12. The second embodiment 11 is particularly adapted to be mounted on existing saws 12. As in the first embodiment 10, the catcher 11 is shown comprised of collecting means having the bag 20 for collecting sawdust from the saw 12 and coupling means for attaching the bag 20 to the saw 12. As in the first embodiment 10, the bag 20 of the second embodiment 11 is provided with the bottom portion 26, the upper portion 28 superior to the bottom portion 26, and the outlet port 24 interposed therebetween. The mesh means are generally coextensive with the outlet port 24, and are comprised of the forminate screen 30 which mechanically couples the bottom portion 26 and the upper portion 28. The mesh of the screen 30 is sized to permit air currents to escape from the interior of the bag 20 while retaining sawdust and chips within the bag 20. Although the plenum design of the bag 20 will tend to collect a substantial portion of the sawdust particles even where the screen 30 is of a very coarse mesh, the preferred range of the mesh sizes is between 1 mm. and 6 mm. [0.040 in. to 0.25 in.].

Referring also to FIG. 5, a sectional elevational view of the second embodiment 11 taken along line 5—5 of FIG. 4 is shown. The bag 20 is provided with the inlet port 22 of a size sufficient to completely envelope the underside of the table portion of the saw 12.

To permit the second embodiment 11 to be coupled to various saws 12, the embodiment 11 is provided with a coupling means, shown generally by reference number 60, which is adjustable to permit a single one of the second embodiment 11 to be adapted to various models and sizes of the saw 12.

Referring to FIG. 6, a sectional view taken along 6—6 of FIG. 5 (with portions of the saw 12 removed for clarity), the coupling means 60 of the second embodiment 11 are shown as being comprised of a frame 62 having a plurality of frame rails 64, adjusting means for permitting an adjustment of the length of each of the frame rails 64, a plurality of clamps 66 disposed to clamp to a lower portion of the table portion of the saw 12, with each of the clamps 66 individually coupled to one of the frame rails 64, and connecting means for controllably releasably connecting the bag 20 to the frame 62.

Referring further to FIG. 7, a view taken along line 7—7 of FIG. 6 is shown. To permit the bag 20 of the second embodiment 11 and ample range of adjustment, the adjusting means can be advantageously comprised of a series of frame rail apertures 68 in each of the frame rails 64 (first and second ones of which are shown by reference number 64A, 64B) so disposed that one or more mechanical couplers 70 can be passed through corresponding ones of the apertures 68 to permit the ends of the frame rails 64 to be positioned sufficiently close to the legs 14 to locate the inlet port 22 under substantially the entire lower surface of the table portion of the saw 12. To provide the second embodiment 11 with a range of adjustment adequate to permit adaptation to the wide range of saws already in use, the upper portion 26 of the bag 20, while being of large maximum circumference, is preferably provided with a resilient upper strip 72 so that the circumference of the inlet port 22 can be stretchably varied. In this manner, a single bag 20 can be readily adapted to saws 12 of various sizes. The connecting means are shown as a snap fastener 73 having a first portion 73A coupled to the upper portion 26 of the bag 20, and having a second portion 73B coupled to one of the frame rails 64, as for example by a strap 74. One of the straps 74 is preferably coupled near the end of each of the frame rails 64 in a manner to permit the respective frame rails 64 to be adjusted to position the strap 74 near the legs 14 of the saw 12 so that the inlet port 22 of the bag 20 encompasses substantially the entire lower surface of the table portion of the saw 12. The second embodiment 11 can thus be provided as a universal kit, adaptable to a wide range of saw already in use. Alternatively, the coupling means could be comprised of fastener means for coupling the bag 20 to the saw 12, as for example the snap fasteners 73 having a first portion 73A coupled to the bag 20, and having a second portion 73B coupled to the saw 12, with the first portion 73A and the second portion 73B having a releasable coupling one to another.

While the invention has been particularly described and shown in reference to the preferred embodiments thereof, it will be understood by those skilled in the art that various changes in form and detail and omissions may be made therein without departing from the spirit and scope of the invention.

What is claimed is:
1. A sawdust catcher, comprising:
collecting means having a bag provided with an inlet port and an outlet port for collecting sawdust from a table saw;
coupling means for attaching said bag to said table saw;
said collecting means further comprising mesh means having a peripheral coupling to said outlet port for trapping sawdust particles within said bag and further for exhausting air;
said mesh means comprising a foraminate screen;
said bag including a bottom portion;
said bag further provided with an upper portion having said inlet port at an uppermost portion thereof and having said outlet port positioned between said bottom portion and said inlet port so that sawdust can collect on an interior of said bottom portion and air can escape through said outlet port;
said screen having communication with said upper portion and further having communication with said lower portion;
said collecting means further comprising a frame having a plurality of frame rails;
said collecting means including adjusting means having communication with said frame for permitting an adjustment of the length of each of said frame rails;
said collecting means having a plurality of clamps disposed to clamp to a lower portion of said table saw and individually having a coupling to one of said plurality of frame rails;
said collecting means provided with at least an upper portion of said bag having resiliency so that the circumference of said inlet port can be stretchably varied; and
said collecting means further including connecting means for releasably connecting said bag to said frame.
2. A catcher in accordance with claim 1 wherein said adjusting means comprising:
a plurality of mechanical couplers;
said frame rails individually having a plurality of apertures; and
at least two of said apertures of a first one of said rail members having alignability with at least two of said apertures of a second one of said rail members so that rail members can be rigidly coupled with said mechanical couplers.
* * * * *